United States Patent [19]
Van Schyndel

[11] Patent Number: 5,729,604
[45] Date of Patent: Mar. 17, 1998

[54] SAFETY SWITCH FOR COMMUNICATION DEVICE

[75] Inventor: Andre John Van Schyndel, Kanata, Canada

[73] Assignee: Northern Telecom Limited, Montreal, Canada

[21] Appl. No.: 615,908

[22] Filed: Mar. 14, 1996

[51] Int. Cl.[6] .................................................. H04M 1/60
[52] U.S. Cl. ...................... 379/388; 379/390; 379/395; 379/420
[58] Field of Search .................... 379/388, 420, 379/61, 56, 58, 63, 96, 355, 387, 390, 395, 419, 421, 428, 432, 433, 457, 56.1, 93.17, 93.27; 313/523; 327/517

[56] References Cited

U.S. PATENT DOCUMENTS

| | | | |
|---|---|---|---|
| 3,109,893 | 11/1963 | Burns | 379/420 |
| 3,764,819 | 10/1973 | Muller | 307/116 |
| 4,206,318 | 6/1980 | Steely | 379/420 |
| 4,330,690 | 5/1982 | Botros | 379/420 |
| 4,396,799 | 8/1983 | Franzen et al. | 379/388 |
| 4,531,287 | 7/1985 | Shibata et al. | 30/43.6 |
| 4,543,665 | 9/1985 | Sotelo et al. | 455/606 |
| 4,735,357 | 4/1988 | Gregory et al. | 236/93 |
| 5,010,566 | 4/1991 | Seo | 379/61 |
| 5,224,151 | 6/1993 | Bowen et al. | 379/58 |
| 5,276,916 | 1/1994 | Pawlish et al. | 455/89 |
| 5,335,276 | 8/1994 | Thompson et al. | 379/88 |
| 5,337,353 | 8/1994 | Boie et al. | 379/388 |
| 5,432,835 | 7/1995 | Hashimoto | 379/387 |
| 5,526,411 | 6/1996 | Krieter | 379/110 |

*Primary Examiner*—Krista Zele
*Assistant Examiner*—Scott L. Weaver
*Attorney, Agent, or Firm*—Jean-Pierre Fortin

[57] ABSTRACT

A communication device such as a portable wireless terminal for a telephone system having a proximity sensor to automatically switch the receiving transducer from receiver mode to loudspeaker mode. The proximity sensor is positioned in the handset such that the associated circuitry switches the transducer from loudspeaker mode to receiver mode in response to the handset being brought into proximity with the user's ear.

17 Claims, 2 Drawing Sheets

SAFETY SWITCH FOR COMMUNICATION DEVICE

FIELD OF THE INVENTION

This invention relates to portable communication devices such as telephone handsets and more particularly, wireless handsets for personal communication systems.

BACKGROUND OF THE INVENTION

With the ever-increasing popularity of portable wireless terminals, service providers are encouraged to make available more and more services to personal communications system subscribers. For many of these services, such as voice mail, routing through automated answering systems, etc., it is desirable that the terminal have both a receiver for conventional use and a loudspeaker for handsfree operation. This allows the loudspeaker mode to be employed while the user is holding the handset in one hand while keying the dial-pad with the other. This also applies to terminals having elaborate displays including touch and writeable displays wherein the user needs to see and perhaps write on the display while listening. Also, a loudspeaker mode may be required to provide broadcast capability wherein several listeners can receive the same communication. On the other hand, there are frequent occasions in which the user prefers the privacy provided by the conventional receiver mode with the handset held against the user's ear.

These separate modes of operation inevitably lead to swapping between the handsfree and handset modes of the terminal. In this description, handsfree means loudspeaker mode, and handset means receiver mode. It will be apparent that the handset can be equipped with a manual switch to select between the two modes of operation. It may not, however, be convenient in many circumstances to operate the manual switch while using the handset. There is also a safety issue involved inasmuch as the loudspeaker mode could damage the user's hearing if the handset is brought close to the user's ear without first switching over to the receiver mode. This is particularly true if the receiver and loudspeaker functions are provided by the same transducer as might be the implementation in order to save on cost and/or real estate within the handset.

There is, therefore, a need for a communication device such as a handset having means to automatically switch between loudspeaker and receiver modes depending on the location of the handset relative to the user's ear.

PRIOR ART

Proximity type switches have been used in telephone systems in the past. For example, U.S. Pat. No. 3,109,893, which issued Jan. 3, 1961 to R. V. Burns, discloses a proximity operated loudspeaking telephone for incoming calls which permits the user to turn the phone on, engage in a conversation, and turn the phone off, without coming into physical Contact with the telephone. In the '893 patent the proximity switch includes an oscillator and a capacitance sensitive switch connected to the oscillator. The capacitance of the capacitance switch is altered by the presence of an object such as a user's hand in proximity thereto. The change in capacitance is used to trigger a change in the oscillator which in turn is used to activate the proximity switch.

U.S. Pat. No. 4,330,690 issued May 18, 1982 to Botros and assigned to Northern Telecom, discloses a proximity switch for automatically switching a conventional telephone set from receiver mode to loudspeaker mode. The switch employs transducer means such as an emitter coil and a pickup coil with one of the coils located on the headset and the other on the base of the terminal. The switch is operable according to the inductive coupling between the coils. Alternatively, the transducer means can comprise a pair of concentric conducting rings formed on the handset adjacent the telephone receiver, the switch being responsive to the level of capacitive coupling between the rings when adjacent the telephone user's head.

It is also known to incorporate user activated proximity switches in conjunction with automatic water supply systems in public washrooms. The user's hands under the water faucet reflects a beam from an infrared source onto a detector which provides a signal to an electrically activated water valve. Removal of the user's hand from under the faucet breaks the reflected beam to the detector which then provides a signal to the electronic valve to shut off the water supply.

The present invention relates to the incorporation of a proximity switch in a communications device such as a portable wireless handset wherein the handset operates in receiver mode when the handset is within a predetermined distance from the user's head and can switch automatically to loudspeaker mode when the handset is outside of the predetermined distance. The proximity switch of the present invention can also be used in communication devices having receiving mode only.

SUMMARY OF THE INVENTION

It is an object of the present invention to provide a communication device having a safety switch to automatically switch between a loudspeaker mode and a receiver mode in response to a movement of the device towards the user's ear.

Therefore in accordance with a first aspect of the present invention there is provided a communication device having a receiving means operable in either a receiver mode or a loudspeaker mode. The device further includes selector means to switch the receiving means between the receiver mode and loudspeaker mode, and a proximity sensor to actuate the selector means whereby the receiver mode is operable when the device is proximate to the user's ear and the loudspeaker mode is operable when the device is moved away from the user's ear.

In a preferred embodiment the communication device is a telephone handset such as a portable wireless terminal for a personal communication system.

The proximity selector in a preferred embodiment comprises an infrared transmitter and detector pair embedded or otherwise mounted on the communication device such that a beam from the IR transmitter is reflected by an object close to the device back to the detector.

In a more specific embodiment of the present invention the receiver mode and loudspeaker mode are provided by the same transducer.

In accordance with an embodiment of the invention, a communication device has a housing and a receiving apparatus contained in the housing, the receiving apparatus being operable in a receiver mode and a loudspeaker mode, the device further having switching apparatus for switching the receiving apparatus between the receiver mode and the loudspeaker mode, and a proximity sensor for activating the switching apparatus to operate the receiving apparatus in the loudspeaker mode when the device is separated from a user's ear by at least a predetermined distance and in the receiver mode when the device is moved to within the predetermined distance from the users ear, a detector for detecting a malfunction in operation of the communication device, and switch apparatus to selectively deactivate the proximity sensor upon detection of the malfunction, and to switch the receiving apparatus to the receiver mode during the malfunction.

In accordance with another embodiment, a communication device has a housing and a receiving apparatus, the receiving apparatus being operable in a receiver mode and in a loudspeaker mode, the device further having switching apparatus for switching the receiving apparatus between the receiver mode and the loudspeaker mode, and a proximity sensor for activating the switching apparatus to operate the receiving apparatus in the loudspeaker mode when the device is separated by at least a predetermined distance from a user's ear and in the receiver mode when the device is separated by less than the predetermined distance from the users ear, the sensor providing an output signal having a first value under quiescent conditions, a second value when the sensor is less than the predetermined distance for activating the switching apparatus, and a third value which is other than between the first and second values in the event of malfunction of the sensor, and apparatus for switching the receiving apparatus to the receiver mode in the event of the output signal reaching the third value.

BRIEF DESCRIPTION OF THE DRAWINGS

The invention will now be described in greater detail with reference to the attached drawings wherein.

DETAILED DESCRIPTION OF THE INVENTION

Figure 1:
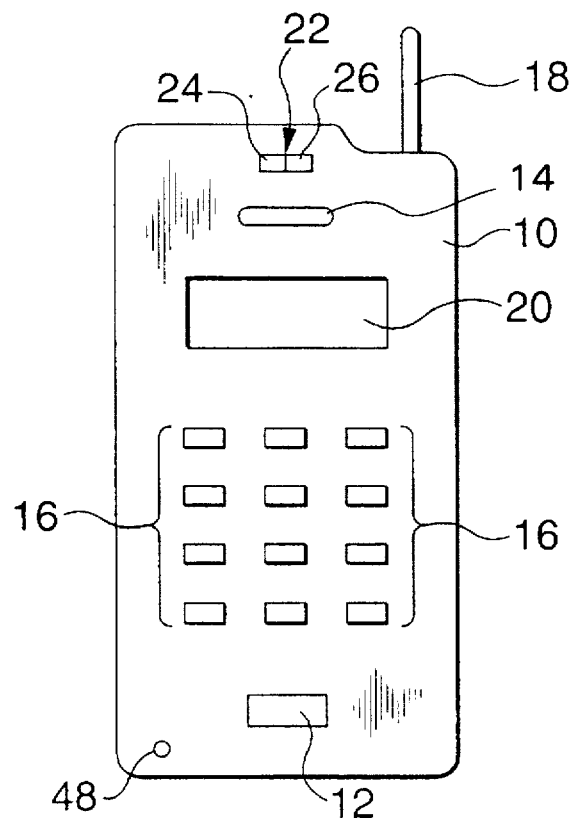
FIG. 1 illustrates generally a portable handset.

In FIG. 1, handset 10 is representative of a portable wireless terminal as used in personal communication systems. Handset 10 includes transmitter or microphone 12, receiver 14, and key pad 16. Also shown are antenna 18 and display area 20 such as might be used to display called numbers etc. In a preferred embodiment the display area will include a liquid crystal display with backlighting as is known in the art. The handset illustrated generally in FIG. 1 is merely to illustrate elements which may be present in such terminals and is not intended to limit the scope of the invention.

Receiver 14 may be accompanied by a separate loudspeaker (not shown), the loudspeaker being used in the handsfree mode. In the present description however it is to be assumed that receiver 14 includes a transducer which permits operation in both receiver mode when the handset is held close to the user's ear, and the loudspeaker mode for handsfree operation.

FIG. 1 also illustrates a proximity detector shown generally at 22. In a preferred embodiment proximity detector 22 includes an infrared transmitter 24 such as a GaAs light emitting diode and infrared detector 26 such as a Si photo-diode or phototransistor.

Other possible options for implementing proximity detection include ultrasonic echo ranging and pulsed radar echo ranging. It is important that the method chosen satisfies certain practical considerations such as: the detector/source in combination with associated circuitry can be accommodated within a small telephone handset; the combination has a low power consumption; the detector senses the proximity of the user's head and responds quickly enough to switch to receiver mode before the handset gets too close to the user's head; the system may incorporate failsafe features; and the detector and related circuitry are sufficiently inexpensive so as not to add significantly to the cost of the terminal. The IR transmitter/detector pair satisfies these criteria and will be described in greater detail herein.

In FIG. 1 the proximity detector 22 is shown as being closely associated physically with the receiver 14. The location of the detector in the handset is not critical as long as the positioning of the handset within a preset distance from the user's ear will result in switching of the transducer from loudspeaker mode to receiver mode. In the case discussed here in which the same transducer is used to provide both loudspeaker and receiver mode, the proximity detector serves to lower the gain of the audio amplifier to thereby lower the sound pressure levels produced by the handset.

Figure 2:
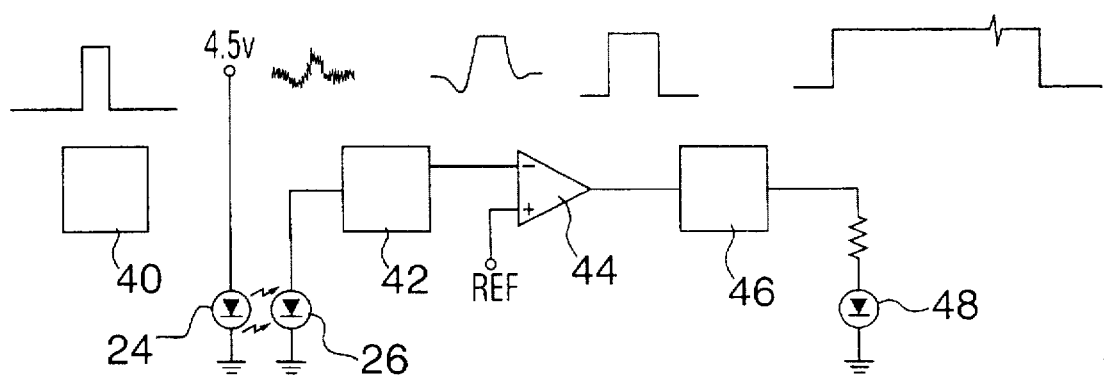
FIG. 2 is a block diagram of an infrared proximity detector circuit according to a preferred embodiment of the invention.

FIG. 2 is a block diagram of the infrared proximity detector and associated circuitry according to an exemplary embodiment of the invention. Pulse generator 40 is used to generate a short duration electrical pulse to the infrared light emitting diode 24 which in turn emits a short duration optical pulse. A pulse of 40 μsec duration with an off time of 22 msecs provides an optical pulse at a reasonable frequency to provide acceptable results. The optical pulse, if reflected back to the handset by an object in close proximity thereto, is detected by the phototransistor 26. The detected optical signal is converted to an electrical signal and amplified and filtered in the low noise preamp and filter 42. This provides a filtered waveform as shown in FIG. 2. The filtered waveform is coupled to comparator 44 with a two-level, selectable threshold which is used to trigger a hold circuit 46 which in turn drives a light emitting diode indicator 48. This signal can also be used to switch the gain of the audio amplifier (not shown) in the handset.

The circuit also includes a failsafe feature. The output of the detector under quiescent conditions is set to be about 50% of the supply voltage. If the detector output rises above 65% of the supply voltage the presence of a reflection is indicated and the circuit responds by forcing the terminal into receiver or handset mode. Conversely, if the detector output falls below 35% of the supply voltage, which might indicate that either the IR emitter is covered or not working or that the circuit or components in the circuit have failed, the failsafe feature forces the terminal into the receiver or handset mode. Thus, the user is not subjected to the high audio amplifier gain of the handsfree mode in the event of component failure in the proximity detector circuit.

In the preferred embodiment of the invention the IR emitter and detector pair are configured to sense the presence of the user's ear approximately 25 cms away. This is sufficient to provide an adjustable range of detection down to 5 cm which is as close as reasonable for safety considerations.

It is to be assumed that the infrared transmitter does not operate in a mode such that the IR beam will pose any safety threat to the skin or eyes of the user of the handset.

It is also to be understood that the communications device in a preferred embodiment, is provided with a manual switch so as to bypass the proximity switch. Thus, when the proximity switch is bypassed, the device acts like a conventional wireless terminal. In proximity detector mode, the terminal will either provide handsfree mode, if the proximity detector determines that it is safe to do so, or forced handset mode if the proximity detector determines that there is an object nearby. Also, if desired, when in the proximity detector mode and the proximity detector forces handset or receiver mode operation for a preset time period (e.g., 15 consecutive seconds), the system may force the device to automatically revert back to handset mode.

It is intended that the proximity detector can be programmed to carry out functions in addition to switching from handset to handsfree mode. For example, the detector can be used to turn off the backlighting of the liquid crystal display in display area 20 when the device is in handset mode. This will help to extend battery life of the communication device. It can also be used to adjust gain and frequency response of the microphone appropriate to handsfree and handset levels.

Figure 3A:
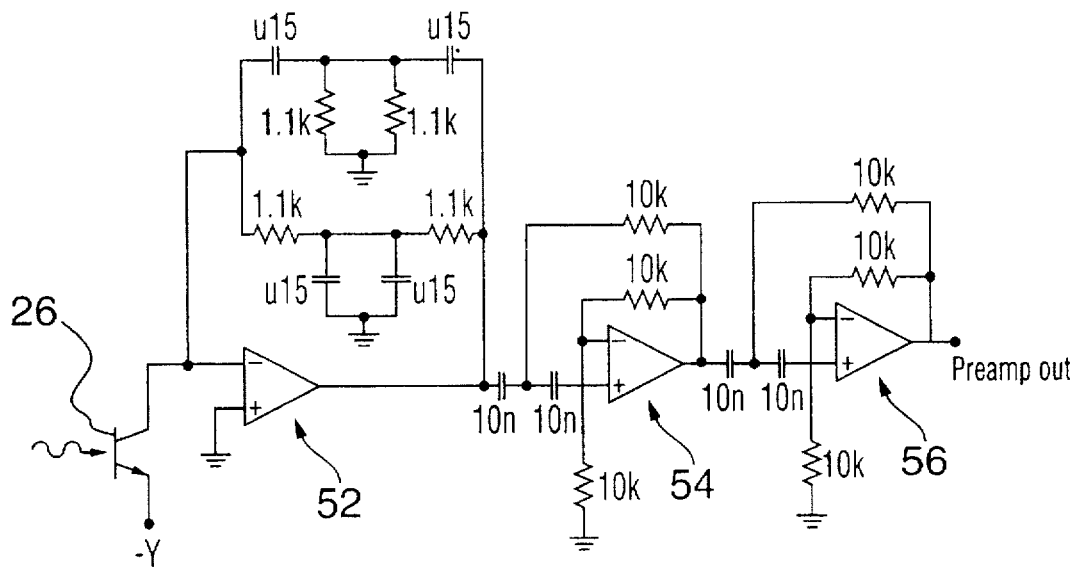
FIGS. 3A and 3B is a schematic diagram of the detector circuit.
Figure 3B:
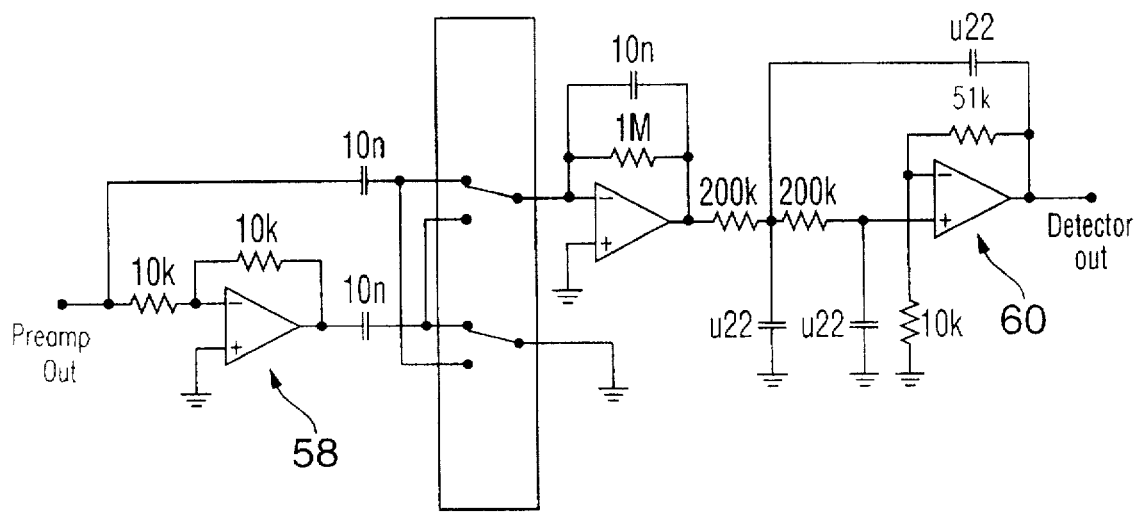

FIGS. 3A and 3B is a schematic diagram of a detector circuit useable to carry out the invention. As shown in FIG. 3A, the detector circuit starts with a transimpedance amplifier 52 and bandpass amplifier 54 followed by a fourth order Butterworth high pass filter 56. The circuit discussed herein is intended to operate in conjunction with an IR emitter using 50% duty cycle at 1 KHz. The need for filtering is decreased if the detection frequency is increased to 40–100 KHz. As shown in FIG. 3B, the signal is then applied to a phase sensitive detector 48 designed to differentiate the input. The signal is differentiated to accommodate a phase shift from the input bypass filter. A second order Butterworth low pass filter 60 then provides the time constant for the phase sensitive detector. Note that inductive and capacitive pickup by the detector is largely in quadrature phase to the infrared signal and is cancelled by the phase sensitive detector.

The foregoing description and accompanying drawings relate to a specific embodiment of the invention. It will be apparent to one skilled in the art that modifications and alterations can be made to this embodiment without departing significantly from the concept of the invention. The scope of the invention is to be assessed in terms of the appended claims.

I claim:

1. A communication device having a housing and a receiving means, said receiving means being operable in a receiver mode and in a loudspeaker mode, said device further having switching means for switching said receiving means between the receiver mode and the loudspeaker mode, and a proximity sensor for activating said switching means to operate said receiving means in loudspeaker mode when said device is separated by at least a predetermined distance from a user's ear and in the receiver mode when said device is separated by less than said predetermined distance from the user's ear, said sensor providing an output signal having a first value under quiescent conditions, a second value when said sensor is less than said predetermined distance for activating said switching means, and a third value which is other than between the first and second values in the event of malfunction of said sensor, and means for switching said receiving means to said receiver mode in the event of the output signal reaching the third value.

2. A communications device as defined in claim 1 in which the second value is a higher amplitude voltage than the first value, and in which the third value is a smaller amplitude voltage than the first value.

3. A communications device as defined in claim 2 being a telephone handset for use in a personal communications system.

4. A telephone handset as defined in claim 3, said receiving means being a receiving transducer operable in both the receiver mode and the loudspeaker mode.

5. A telephone handset as defined in claim 3, said sensor comprising an infrared transmitter and an infrared detector positioned in said handset such that an infrared beam from said infrared transmitter is reflected by a user of the handset to said detector when said user is proximate said handset.

6. A telephone handset as defined in claim 5, said infrared transmitter being a light emitting diode and said detector being a phototransistor.

7. A communications device as defined in claim 2, said predetermined distance being about 25 cm.

8. A communications device as defined in claim 2, said sensor being embedded in said housing.

9. A communications device as defined in claim 6, said light emitting diode being driven by a pulsed power supply with a pulse width of 40 microseconds and a 22 millisecond off time.

10. A telephone handset as defined in claim 5, having display means for providing alpha-numeric information.

11. A telephone handset as defined in claim 10, said display means having a liquid crystal display with backlighting.

12. A telephone handset as defined in claim 11, said sensor also switching said backlighting such that the display means is off when said handset is in the receiver mode.

13. A communications device as defined in claim 2, having a microphone.

14. A communications device as defined in claim 13, said sensor also switching the gain of said microphone.

15. A communications device as defined in claim 13, said sensor also switching the frequency response of said microphone.

16. A telephone handset as defined in claim 5, said detector providing a signal to said switching means, the amplitude of said signal being dependent on the strength of the reflected beam from said infrared transmitter.

17. A communication device having a housing and a receiving means contained in the housing, said receiving means being operable in a receiver mode and a loudspeaker mode, said device further having switching means for switching said receiving means between the receiver mode and the loudspeaker mode, and a proximity sensor for activating said switching means to operate said receiving means in the loudspeaker mode when said device is separated from a user's ear by at least a predetermined distance and in the receiver mode when said device is moved to within said predetermined distance from the user's ear, a detector for detecting a malfunction in operation of said communication device, and switch means to selectively deactivate said proximity sensor upon detection of said malfunction, and to switch the receiving means to the receiver mode during said malfunction.

* * * * *